US005694852A

United States Patent [19]

Bressler et al.

[11] Patent Number: 5,694,852

[45] Date of Patent: Dec. 9, 1997

[54] ROTOGRAVURE PRINTING MEDIA AND METHODS OF MANUFACTURING A ROTOGRAVURE PRINTING DEVICE EMPLOYING THE MEDIA

[75] Inventors: David E. Bressler, Chester; W. Richard Chesnut, Essex Falls; Daniel Calligaro, Little Falls, all of N.J.

[73] Assignee: W.R. Chesnut Engineering, Inc., Fairfield, N.J.

[21] Appl. No.: 682,982

[22] Filed: Jul. 16, 1996

Related U.S. Application Data

[63] Continuation-in-part of Ser. No. 525,880, Sep. 8, 1995, abandoned, which is a continuation-in-part of Ser. No. 991,499, Dec. 17, 1992, abandoned, which is a continuation of Ser. No. 691,693, Apr. 24, 1991, abandoned, which is a continuation-in-part of Ser. No. 514,595, Apr. 26, 1990, abandoned.

[51] Int. Cl.$^6$ .................................. B41N 6/00; C08F 2/46

[52] U.S. Cl. ........................ 101/401.1; 522/100; 522/146; 522/169; 522/170; 428/36.9; 428/412; 428/413; 428/418; 428/906

[58] Field of Search ......................... 101/401.1; 522/100, 522/146, 169, 170; 428/36.9, 412, 413, 418, 906

[56] References Cited

U.S. PATENT DOCUMENTS

| | | |
|---|---|---|
| 2,052,679 | 9/1936 | Wainwright et al. . |
| 2,305,224 | 12/1942 | Patterson . |
| 2,931,297 | 4/1960 | Coudriet . |
| 3,294,889 | 12/1966 | Downie et al. . |
| 4,007,680 | 2/1977 | Pfleger et al. . |
| 4,036,310 | 7/1977 | Giori . |
| 4,048,035 | 9/1977 | Ide et al. . |
| 4,060,656 | 11/1977 | Naka et al. . |
| 4,198,739 | 4/1980 | Budinger et al. . |
| 4,256,828 | 3/1981 | Smith . |
| 4,593,051 | 6/1986 | Koleske . |
| 4,738,899 | 4/1988 | Bluestein et al. . |
| 5,027,513 | 7/1991 | Allison . |

FOREIGN PATENT DOCUMENTS

| | | |
|---|---|---|
| 94142 | 11/1983 | European Pat. Off. . |
| 1544748 | 4/1979 | United Kingdom . |

OTHER PUBLICATIONS

Stork RCS® Sleeve System, Stock Screens America, Inc., Charlotte, N.C.

*Primary Examiner*—Mark Chapman
*Attorney, Agent, or Firm*—John N. Bain; Raymond J. Lillie

[57] ABSTRACT

A printing medium or image carrier for application to a printing apparatus or substrate which comprises a plastic composition which is applied to a printing substrate to form a plastic coating covering the substrate, which plastic coating is engraved to provide a printing medium. Preferred plastic compositions are those including epoxide resins such as cycloaliphatic epoxide resins, reaction products of epichlorohydrin and bisphenol A, bisphenol A epoxy resins modified with cresol novolac(s), epoxy-novolac resins, and epoxy-novolac based vinyl esters. The present invention provides for an effective rotogravure printing medium without the use and/or disposal of hazardous chemicals.

29 Claims, 3 Drawing Sheets

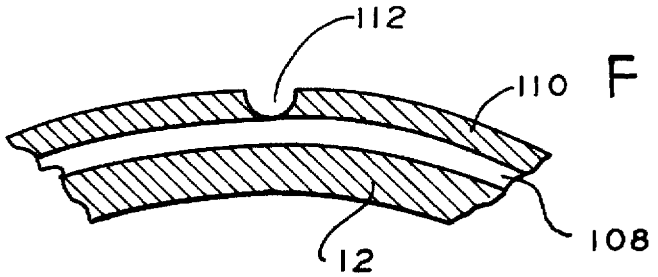
FIG. 4
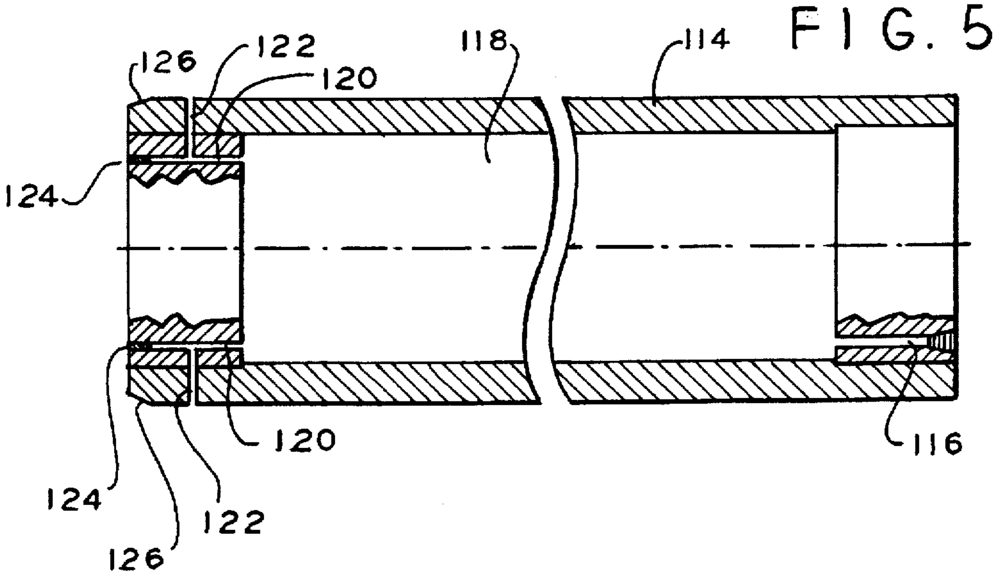
FIG. 5
FIG. 6
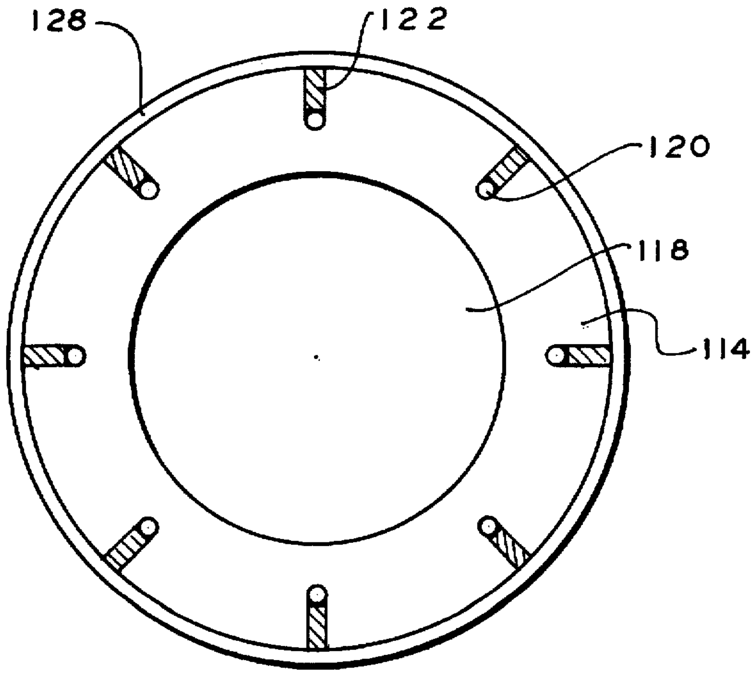

ROTOGRAVURE PRINTING MEDIA AND METHODS OF MANUFACTURING A ROTOGRAVURE PRINTING DEVICE EMPLOYING THE MEDIA

This application is a continuation-in-part of application Ser. No. 08/525,880, filed Sep. 8, 1995, now abandoned which is a continuation in-part of application Ser. No. 07/991,499, filed Dec. 17, 1992, abandoned, which is a continuation of application Ser. No. 07/691,693, filed Apr. 24, 1991, abandoned, which is a continuation-in-part of application Ser. No. 07/514,595, filed Apr. 26, 1990, abandoned.

This invention relates to a printing medium upon a substrate such as a printing roll or a cylinder. More particularly, this invention relates to the application of a plastic printing media to printing rolls or cylinders employed in rotogravure printing.

Rotogravure printing is one of the conventional methods of printing on a sheet, web, or other substrate. The sheet or substrate may be a coated, uncoated, or metallized paper; glassine; plastic films and sheets made from vinyl, cellulose, acetate, polyester and polyethylene; plastic shrink films; paperboard,; aluminum foil, and fabrics. Rotogravure printing is capable of reproducing both subtle shades of color and black and white, and is particularly well suited for printing great numbers of copies precisely and rapidly. Typical end uses include labels, cartons, paper and plastic cups, trading stamps, wrapping paper, and sheet vinyl flooring.

Rotogravure printing is the only commercial printing process which can control both the ink film thickness and the area of coverage. This is achieved by the engraving of recessed microscopic wells, frequently referred to as "cells" of varying depth and area in the printing medium or image carrier surface. In controlling the size and depth of the wells, the amount of ink available for placement on the substrate is governed to generate an image composed of an arrangement of large and small dots.

In a typical rotogravure apparatus, the printing medium or image carrier is a copper film electro-deposited from a chemical bath on a specially prepared steel cylinder.

Prior to the engraving of the recessed wells, the copper is mechanically ground and polished. After engraving, the cylinder requires the addition of plated, hard chromium for durability and wear resistance. During the printing process the cylinder is rotated in a bath of ink. The excess ink is wiped away by a doctor blade and the ink remaining in the engraved cell is then transferred to a substrate, with the substrate acting somewhat like a blotter to which the ink is transferred as discrete dots as the substrate passes between the engraved cylinder and a soft pressure roller.

The recommended modern process to prepare a copper image carrier requires the use of electrolytic deposition from an acid/copper bath. A steel base of the required diameter is partly immersed in a chemical copper solution and rotated at a regulated speed. Art electrical current running through the solution gradually deposits a coating of copper on the rotating cylinder until the approximate required thickness is achieved. The copper plated cylinder is washed and then polished to final dimensions with a smooth, mirror like surface finish.

The copper coating is then engraved, either chemically or electronically. In the chemical engraving process, wells are formed by acid etching of the copper coating. The wells of the cell are formed by a screen running at right angles which prevents the acid from reaching the copper surface. The resulting acid-etched wells are round in shape and slightly smaller at the bottom than at the top.

The process of forming the copper coating for the printing cylinder and of chemically engraving the copper coating may result in the formation of waste products which are environmentally hazardous, requiring costly disposal.

In accordance with an aspect of the present invention, there is provided a printing medium for application to a printing apparatus (e.g., a rotogravure printing drum or cylinder). The term "printing apparatus", as used herein, means any apparatus or device which transfers an inked image. The medium comprises a plastic composition which is applied to a substrate to form a plastic coating covering the printing substrate, which plastic coating is engraved to provide a printing surface.

The plastic composition may be part of an ultra-violet (UV) cured system, a heat cured system, or a room temperature gelled system.

In an ultraviolet cured system, the plastic composition preferably includes at least one epoxide resin selected from the group consisting of cycloaliphatic epoxide resins and amine-based epoxide resins. The plastic composition may further include epoxide resins selected from the group consisting of diglycidyl ether-bisphenol A(DGEBA), a reaction product of epichlorohydrin and bisphenol A, bisphenol A epoxy resins modified with cresol novolac(s), or a polyepoxide obtained by reacting a phenolic novolac with epichlorohydrin. Examples of phenolic novolacs include products of reactions of phenol(s) or cresol(s) with formaldehyde(s), such as orthocresol formaldehyde(s).

In one alternative, the plastic composition may include a bisphenol A epoxy resin modified with cresol novolac(s) and a photoinitiator component.

In another alternative, the plastic composition may comprise vinyl esters derived from epoxy novolac compounds. Such vinyl esters preferably are employed in combination with a styrene monomer.

Cycloaliphatic epoxides are preferably of the carboxylate type, and most preferably 3,4-epoxycyclohexylmethyl-3,4-epoxy-cyclohexane, which has the following structural formula.

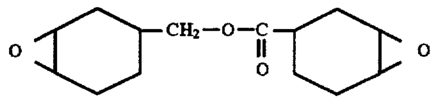

Examples of cycloaliphatic epoxides which may be employed include Cyracure(R) UVR-6100 and UVR-6110, ERL-4221, which are products of Union Carbide Corporation, Danbury, Conn., and Araldite(R) CY179, a product of Ciba-Geigy. UVR-6100 has a Brookfield viscosity at 25° C. of from 85 to 115 cP, a specific gravity at 20° C. of 1.1395, and an epoxy equivalent weight (EEW) of from 130 to 140. UVR-6110 and ERL-4221 each have a Brookfield viscosity (25° C.) of from 350 to 450, a specific gravity of 1.175, and an epoxy equivalent weight of 131 to 143.

Bisphenol A-epichlorohydrin reaction products have the following general structural formula:

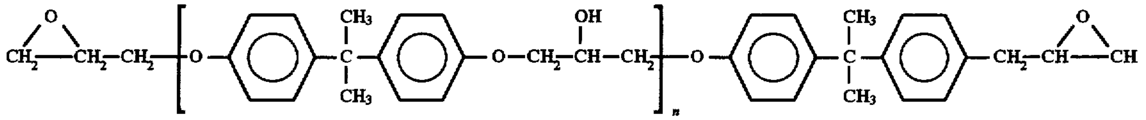

Preferably, n is from 1 to about 100.

Examples of amine-based epoxy resins which may be employed include, but are not limited to, Ciba-Geigy Epoxy Resin 0500 and Araldite$^R$ MY720, both of which are products of Ciba-Geigy Corporation, Plastics Department, Hawthorne, N.Y. Ciba-Geigy Epoxy Resin 0500 is a high functionality amine-based resin, and has an epoxy equivalent weight of from 105 to 115 g/g-mole, a viscosity at 25° C. of from 1,500 to 5,000 cps, and a specific gravity of from 1.215 to 1.225. Araldite$^R$ MY720 is N, N, N', N'-tetraglycidyl-4,4'-methylenebisbenzenamine, and has an epoxy value of from 0.75 to 0.85 eq/100 g, a weight per epoxide of from 117 to 134 g/g-mole, and a viscosity at 50° C. of from about 8,000 to about 18,000 cP.

An example of a reaction product of epichlorohydrin and bisphenol A which may be employed is D.E.R. 330, a product of Dow Chemical Company, Midland, Mich. D.E.R. 330 has a viscosity at 25° C. of from 7,000 to 10,000 and an epoxy equivalent weight of from 176 to 185.

Bisphenol A epoxy resins modified with cresol novolac (s) include, but are not limited to, Experimental Resin XU-252, a product of Ciba-Geigy Corporation, Resins Department, Hawthorne, N.Y. XU-252 is a multifunctional epoxy resin, which is a chemically modified bisphenol A epoxy resin having a cresol novolac component as a minor portion of the epoxy resin. The cresol novolac component does not exceed 20 wt. % of the resin. XU-252 has a viscosity at 52° C. of from 1,000 to 1,600 CP, an epoxy value of from 0.51 to 0.54 eq./100 g, a density of from 9.6 to 9.8 pounds per gallon at 25° C., and a flash point (closed cup) of greater than 200° F.

Polyepoxides obtained by reacting a phenolic novolac with epichlorohydrin include those having the following structural formula:

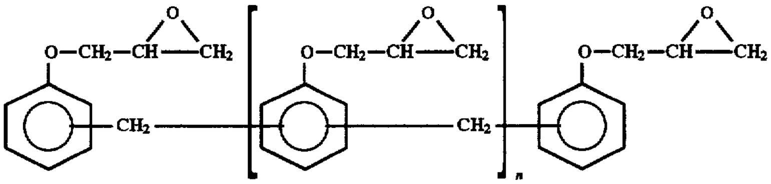

Preferably, n is from 1 to about 100.

An example of a polyepoxide obtained by reacting a phenolic novolac with epichlorohydrin is EPN 1139, a product of Ciba-Geigy.

Vinyl esters derived from epoxy-novolac compounds incorporate an epoxy novolac backbone such as that hereinabove described while providing for an easily accessible terminal unsaturation. An example of a vinyl ester derived from an epoxy novolac compound which may be employed is Derakane 470-36, a product of Dow Chemical Company. This product also includes from 30% to 50% by weight of a styrene monomer. Derakane 470-36 has a Brookfield viscosity at 25° C. of from 160 to 250, and a specific gravity of 1.071.

It is to be understood that each of the epoxide resins may be employed alone in the UV curable system, or in combination with other epoxide resins. For example, a cycloaliphatic epoxide resin may be employed in combination with a reaction product of epichlorohydrin and bisphenol A or a polyepoxide obtained by reacting a phenolic novolac with epichlorohydrin. Epoxide resins which may be employed in accordance with the present invention are also generally described in the *Modern Plastics Encyclopedia*, 1980–1981, pgs. 28–30.

The UV curable system may further include a flexibilizing component, a photoinitiator component, a surfactant or surface modifier, a slip agent, and/or a resin modifier.

Flexibilizing components which may be employed include, but are not limited to, cycloaliphatic epoxides or polyols such as caprolactone polyester-or-polyether-based polyols such as diols and triols and polypropylene oxide triols, and activated polyolefins.

Examples of cycloaliphatic epoxides which may be employed include Cyracure R UVR-6351 and UVR-6379, which are products of Union Carbide Corporation. UVR-6351 has a Brookfield viscosity at 25° C. of 850 cP, a specific gravity at 20° C. of 1.1204, and an epoxy equivalent weight of from 455 to 465. UVR-6379 has a viscosity of 225 cP, a specific gravity of 1.0531, and an epoxy equivalent weight of from 455 to 465.

Caprolactone polyester and polyether-based diols and triols which may be employed include polycaprolactone polyester-based triols having the structural formula:

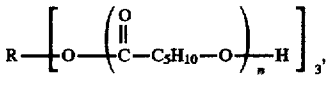

wherein n is an integer of at least 1, and R preferably is trimethylol propane or glycerin. Examples of such triols include Tone $^R$0305 and Tone $^R$0310, which are products of Union Carbide Corporation. Tone 0305 has a melting point of 20° C., a viscosity at 25° C. of 516 cSt and at 55° C. of 200 cSt, and an average molecular weight of 540. Tone 0310 has a melting point range of from 27° C. to 32° C., is a solid at 25° C., has a viscosity of 270 cSt at 55° C., and an average molecular weight of 900.

Polypropylene oxide triols which may be employed have the formula:

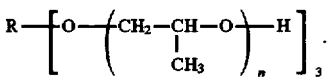

Preferably, R is glycerin of trimethylol propane and n is from 10 to about 100. Examples of such polypropylene oxide triols are sold by Union Carbid Corporation as Niax LHT-34 and Niax LHT-240. Niax LHT-34 is a glycerin-started polypropylene oxide triol taken to a hydroxyl number of 34, and has a molecular weight of about 5,000, a viscosity at 25° C. of 950 cP, and a specific gravity of 1.006. Niax LHT-240 is a glycerin-started polypropylene oxide triol taken to a hydroxyl number of 240, and has a molecular weight of 710, a viscosity at 25° C. of 270 cP, and a specific gravity of 1.021.

Examples of activated polyolefins which may be employed include, but are not limited to, activated polybutenes which include an epoxide functionality. Examples of activated polybutenes include Actipol E6, Actipol E16, and Actipol E23. Such activated polybutenes have an epoxide functionality at one end, which provides a means of chemically incorporating hydrophilic characteristics in polar formulations. Actipol E6 has a viscosity (ASTM D445) at 38° C. of 65 cST, an average molecular weight of 365, a flash point (ASTM D92) of 154° C., a specific gravity of 0.877 at 60° F., and a refractive index (ASTM D1218) of 1.464. Actipol E16 has a viscosity (ASTM D445) at 99° C. of 287 cST, an average molecular weight of 973, a flash point (ASTM D92) of 218° C., a specific gravity at 60° F. of 0.904, and a refractive index (ASTM D1218) of 1.495. Actipol E23 has a viscosity (ASTM D445) of 916 cST, an average molecular weight of 1,433, a flash point (ASTMD92) of 280° C., a specific gravity at 60° F. of 0.904, and a refractive index (ASTM D1218) of 1.504. Actipol E6, Actipol E16, and Actipol E23 are products of Amoco Chemical Company, Chicago, Ill.

Examples of photoinitiators which may be employed include, but are not limited to, triaryl or triphenylsulfonium containing mixtures such as mixtures of triarylsulfonium hexafluoroantimonate salts or triarylsulfonium hexafluorophosphate salts and propylene carbonate, or mixtures containing triphenyl sulfonium hexafluorophosphate and 2-(3H)-dihydro-furanone, or (n'-2,4-cyclopentadiene-1-yl)-(1,2,3,4,5,6-n)(1-methylethylbenzene)-iron(+)-hexafluorophosphate ($C_{14}H_{17}F_6PFe$). A representative example of a mixture of a triarylsulfonium hexafluoro antimonate salt is Cyracure UVI-6974, sold by Union Carbide Corporation. UV1-6974 is a mixture of 50% triarylsufonium hexafluoro antimonate salts and 50% propylene carbonate, and has a viscosity at 30° C. of 75 cP, and a specific gravity of 1.39. A representative example of a mixture of a triarylsulfonium hexafluorophosphate salt and propylene carbonate is Cyracure UVI-6990, sold by Union Carbide Corporation. UVI-6990 is a mixture of 50% triarylsulfonium hexafluorophosphite salts and 50% propylene carbonate, and has a viscosity at 25° C. of 75 cP, and a specific gravity of 1.32.

A representative example of a mixture of triphenyl sulfonium hexafluorophosphate and 2-(3H)-dihydro-furanone is sold as FX-512, by the 3M Industrial Chemical Products Division of 3M Corporation of St. Paul, Minn. FX-512 is a mixture of from 20% to 45% triphenyl sulfonium hexafluorophosphate, 40% of 2(3H)-dihydrofuranone, and the remainder being aromatic sulfonium coproducts. FX-512 has a specific gravity of 1.300 and a boiling point of 204° C.

A representative example of (n'-2,4-cyclopentadiene-1-yl)-(1,2,3,4,5,6-n)(1-methylethylbenzene)-iron (+)-hexafluorophosphate ($C_{14}H_{17}F_6PFe$) is Irgacure 261, a product of Ciba-Geigy corporation, Ardsley, N.Y.

Irgacure 261 is a yellow, crystalline powder having a melting point of from about 85° C. to about 88° C., and the following solubilities at 20° C. (g/100 g solution):

| | |
|---|---|
| Acetone | >50 |
| Ethyl Acetate | >50 |
| Methanol | 10 |
| Xylene | 0.2 |

Although the scope of the present invention is not intended to be limited by any theoretical reasoning, the photoinitiators provide for an ionic, preferably a cationic, curing mechanism for the epoxide compound which is triggered by using ultraviolet light from conventional UV exposure sources to produce a coating on the printing substrate which may function as an effective printing medium.

The ultraviolet light curing may take place using ultraviolet light having a wavelength of from about 250 nm to about 750 nm. The ultraviolet curing system composition may be exposed to the light for a period of time of from about 15 seconds to about 45 minutes. The ultraviolet exposure source may have a wattage of from about 15 watts to about 400 watts per inch, and may for example, be a fluorescent lamp, a mercury vapor lamp, a carbon arc lamp, actinic or superactinic fluorescent lamps, xenon lamps, or lasers with ultraviolet components such as argon lasers.

It is also to be understood that within the scope of the present invention that the ultraviolet curing system compositions herein described may be applied to any cylindrical surface irrespective of whether the surface is employed as a printing surface, and cured under ultraviolet curing conditions such as those hereinabove described to provide crosslinking of the hereinabove described epoxide resins.

Surfactants or surface modifiers which may be employed in the UV curing system include but are not limited to nonionic fluoroaliphatic polymeric ester surfactants and organomodified polymethyl siloxane copolymers.

An example of a nonionic fluoroaliphatic polymer surfactant is sold as FC-430 by 3M Industrial Chemical Products Division. FC-430 has a Brookfield viscosity at 25° C. of 7,000 cP, a specific gravity of about 1.1, and a flash point (Seta Flash Closed Cup) of greater than 200° F.

An example of an organomodified polymethylsiloxane copolymer surfactant is sold as Silwet Surfactant L-7604, by Union Carbide Corporation. Silwet Surfactant L-7604 contains greater than 99% of an organomodified polymethylsiloxane and less that 0.5% toluene. It has a boiling point of greater than 150° C. (at 760 mm Hg) and a freezing point of 10° F. and a specific gravity of 1.06.

Slip agents which may be employed include, but are not limited to, ultramicronized wax powders, preferably having a particle size no greater than 10 microns, such as those containing polyethylene particles or polytetrafluoroethylene particles. Examples of such ultramicronized wax powders include those sold by Durachem as Microfine CP-9A and Peflu 727. Microfine CP-9A is a micronized wax powder of polyethylene particles having a maximum particle size of 10 microns and an average particle size of from 2 to 3 microns. Microfine CP-9A has a melting point of from 111°-114° C., and a density of 0.960. Peflu 727 is a micronized wax powder of polytetrafluoroethylene particles having a maximum particle size of 10 microns and an average particle size of 5 microns. Peflu 727 has a melting point of greater than 160° C., and a density of about 2.3.

Resin modifiers which may be employed in the ultraviolet cured system include, but are not limited to, acrylates such as methacrylate monomers and oligomers and urethane acrylates. Such resin modifiers can enhance the ultraviolet curing of the epoxide resin. An example of a methacrylate compound which may be employed is tetraethylene glycol dimethacrylate, which has the following structure:

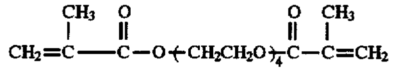

A commercially available tetraethylene glycol dimethacrylate is sold as Photomer R 2009 by Henkel Corporation, Ambler, Pa. Tetraethylene glycol dimethacrylate is a low viscosity, long chain cross-linker which also imparts solvent resistance, heat resistance, and increased hardness to the plastic composition which forms the coating for the printing substrate.

Urethane acrylates which may be employed may be aliphatic urethane acrylates having the following structure:

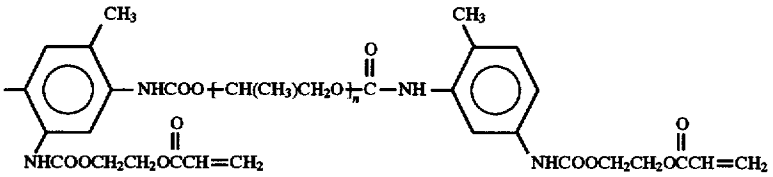

wherein n is an integer of at least 1. An example of such an aliphatic urethane acrylate is sold as Photomer R 6008, by Henkel Corporation. Aliphatic urethane acrylates may be employed to provide the plastic composition with increased abrasion resistance and high temperature stability.

The at least one epoxide resin, may be employed in the ultraviolet during system as the only component; however, such epoxide resin preferably is employed in an amount of from about 65 wt. % to about 97.5 wt. %. As hereinabove stated, there may be one epoxide resin or a mixture of epoxide resins in the ultraviolet curing system.

The flexibilizer component, when employed, may be added to the ultraviolet curing system in an amount of up to about 40 wt. %, preferably from about 10 wt. % to about 30 wt. %. The photoinitiator component may be employed in amounts from about 1.0 wt. % to about 4.0 wt. %, preferably at about 3.0 wt. %. The surfactant may be present in amounts from about 0.5 wt. % to about 1.0 wt. %, preferably at about 0.5 wt. %.

The resin modifier component, when employed, may be present in an amount of up to about 40 wt. %, and preferably from about 15 wt. % to about 30 wt. %.

Representative ultraviolet curing-system plastic compositions which may be employed in accordance with the present invention include the following Formulae I through XVI listed below:

| | |
|---|---|
| Formula I | |
| Cyracure UVR-6100 | 68.0 wt. % |
| Cyracure UVR-6351 | 28.5 wt. % |
| Cyracure UVI-6974 | 3.0 wt. % |
| Silwet L-7604 | 0.5 wt. % |
| Formula II | |
| Cyracure UVR-6100 | 70.0 wt. % |
| D.E.R. 330 | 26.5 wt. % |
| Cyracure UVI-6974 | 3.0 wt. % |
| Silwet L-7704 | 0.5 wt. % |

-continued

| | |
|---|---|
| Formula III | |
| Cyracure UVR-6100 | 80.0 wt. % |
| EPN 1139 | 16.5 wt. % |
| Cyracure UVI-6974 | 3.0 wt. % |
| Silwet L-7604 | 0.5 wt. % |
| Formula IV | |
| Cyracure UVR-6100 | 76.5 wt. % |
| D.E.R. 330 | 10.0 wt. % |
| EPN 1139 | 10.0 wt. % |
| Cyracure UVI-6974 | 3.0 wt. % |
| Silwet L-7604 | 0.5 wt. % |
| Formula V | |
| Cyracure UVR-6110 | 80.0 wt. % |

-continued

| | |
|---|---|
| Tone 310 | 16.5 wt. % |
| Cyracure UVI-6974 | 3.0 wt. % |
| Silwet L-7604 | 0.5 wt. % |
| Formula VI | |
| Cyracure UVR-6100 | 80.0 wt. % |
| Photomer 2009 | 16.5 wt. % |
| Cyracure UVI-6974 | 3.0 wt. % |
| Silwet L-7604 | 0.5 wt. % |
| Formula VII | |
| Cyracure UVR-6110 | 85.0 wt. % |
| Niax LHT-240 | 11.0 wt. % |
| Cyracure UVI-6974 | 3.0 wt. % |
| Silwet L-7604 | 0.5 wt. % |
| Formula VIII | |
| Cyracure-UVR-6100 | 70.0 wt. % |
| Photomer-6008 | 26.5 wt. % |
| Cyracure UVI-6974 | 3.0 wt. % |
| Silwet L-7604 | 0.5 wt. % |
| Formula IX | |
| Cyracure-UVR-6100 | 96.5 wt. % |
| Cyracure-UVR-6974 | 3.0 wt. % |
| Silwet L-7604 | 0.5 wt. % |
| Formula X | |
| Cyracure-UVR-6110 | 77.2 wt. % |
| Cyracure-UVR-6100 | 19.3 wt. % |
| Cyracure UVI-6974 | 3.0 wt. % |
| Silwet L-7604 | 0.5 wt. % |
| Formula XI | |
| Cyracure-UVR-6100 | 96.5 wt. % |
| Silwet L-7604 | 0.5 wt. % |
| FX-512 | 3.5 wt. % |
| Formula XII | |
| Cyracure-UVR-6100 | 90.5 wt. % |
| FX-512 | 3.5 wt. % |
| Silwet L-7604 | 0.5 wt. % |
| CP-9A | 3.0 wt. % |
| Peflu 727 | 2.5 wt. % |
| Formula XIII | |
| Cyracure-UVR-6100 | 91.0 wt. % |

-continued

| | |
|---|---|
| Cyracure-UVR-6974 | 3.0 wt. % |
| Silwet L-7604 | 0.5 wt. % |
| CP-9A | 3.0 wt. % |
| Peflu 727 | 2.5 wt. % |
| Formula XIV | |
| Cyracure UVR-6110 | 86.0 wt. % |
| Actipol E6 | 10.0 wt. % |
| Cyracure UVI-6974 | 3.0 wt. % |
| Silwet L-7604 | 0.5 wt. % |
| Formula XV | |
| Cyracure UVR-6110 | 48.3 wt. % |
| Resin XU 252 | 48.2 wt. % |
| Cyracure UVI-6974 | 3.0 wt. % |
| Silwet L-7604 | 0.5 wt. % |
| Formula XVI | |
| Resin XU 252 | 96.5 wt. % |
| Silwet L-7604 | 0.5 wt. % |
| FX-512 | 3.0 wt. % |

Heat cured plastic copositions may include at least one epoxide resin selected from the group consisting of cycloaliphatic epoxide resins and amine-based epoxide resins such as those hereinabove described for use in the ultraviolet curing system. The heat cured plastic compositions may further include epoxide resins selected from those which may be added to the cycloaliphatic or amine-based epoxides in the ultraviolet cure system.

In another embodiment, the heat cured plastic composition may include an epoxy resin which is a reaction product of epichlorohydrin and bisphenol A, and a curing agent selected from the group consisting of fluoroaliphatic salt solutions, imidazoles, and amine curing agents.

In yet another embodiment, the heat cured plastic composition may include a bisphenol A epoxy resin modified with cresol novolac(s), and a curing agent selected from the group consisting of fluoroaliphatic salt solutions, imidazoles, and amine curing agents. Preferably, the curing agent is an amine curing agent.

The heat cured plastic compositions may also include at least one phenolic resin. Phenolics are generally products of the chemical reaction of phenol and formaldehyde. Phenolics are further described in the *Modern Plastics Encyclopedia*, 1980–1981, pgs. 40 and 43. An example of a phenolic resin which may be employed is Methylon 75108, a product of General Electric.

The heat cured compositions may further include flexibilizing component(s), curing agent(s), and/or surfactant(s).

The flexibilizing component may be a polyol such as a caprolactone polyester- or polyether-based diol or triol or a polypropylene oxide triol or an activated polyolefin such as those described hereinabove for use in the ultraviolet curing system.

Curing agents which may be employed include, but are not limited to, fluoroaliphatic salt solutions, imidazoles, and amine curing agents. A preferred fluoroaliphatic salt solution which may be employed is a solution of 60% of the diethylammonium salt of trifluoromethane sulfonic acid, 20% water, and 20% 2-(2-ethoyethoxy) ethanol. Such a solution is commercially available as FC-520, a product of 3M Industrial Chemical Products Division, and has a boiling point of 210° F., and a pH of from about 4.5 to about 6.0.

Imidazoles which may be employed include ethylmethylimidazoles such as 2-ethyl-4 methyl imidazole, which has the following structure:

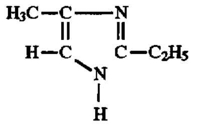

2-ethyl-4-methyl imidazole is available commercially as EMI-24 from Pacific Anchor Chemical Company. Surfactants which may be employed in the heat cured plastic compositions include, but are not limited to, nonionic fluoroaliphatic polymeric ester surfactants and organomodified polymethyl siloxane copolymer surfactants such as those hereinabove described for use in the ultraviolet curing system.

Amine curing agents which may be employed include, but are not limited to aliphatic amine curing agents and aromatic amine curing agents. In one embodiment, the amine curing agent is an aliphatic amine curing agent. Aliphatic amine curing agents which may be employed include, but are not limited to, HY943 and HY2964, products of Ciba-Geigy Corporation, Plastics Division, Hawthorne, N.Y. HY943 has a viscosity at 25° C. of 3,300 to 6,000 cP, a specific gravity at 25° C. of 1.08, and a flash point of 110° C. HY2964 is a low viscosity liquid modified aliphatic amine having a viscosity at 25° C. from 40 to 70 cP, a flash point of less than 200° F., and a density of 8.3 pounds per gallon.

The epoxide resin(s) may be present in the heat cured composition as the only component; however, the epoxide resin(s) preferably is/are present in an amount of from about 70 wt. % to about 98.5 wt. %. The phenolic resin, when employed, may be present in an amount up to about 20 wt. %.

The flexibilizing component may be present in an amount of up to about 30 wt. %, preferably from about 8.0 wt. % to about 30 wt. %. The curing agent may be present in an amount of up to about 10 wt. %, and preferably from about 1.0 wt. % to about 8.0 wt. %. The surfactant may be present in an amount of up to about 1.0 wt. %, and preferably from about 0.5 wt. % to about 0.6 wt. %.

Representative examples of heat cured plastic compositions include the following Formulae XVII through XXXVI listed below.

| | |
|---|---|
| Formula XVII | |
| ERL-4221 | 88.4 wt. % |
| Tone 305 | 10.0 wt. % |
| FC-520 | 1.0 wt. % |
| Silwet L-7604 | 0.6 wt. % |
| Formula XVIII | |
| ERL-4221 | 70.0 wt. % |
| D.E.R. 330 | 20.0 wt. % |
| Niax LHT-34 | 8.4 wt. % |
| FC-520 | 1.0 wt. % |
| FC-430 | 0.6 wt. % |
| Formula XIX | |
| D.E.R.-330 | 70.0 wt. % |
| Tone-305 | 28.4 wt. % |
| FC-520 | 1.0 wt. % |
| FC-430 | 0.6 wt. % |
| Formula XX | |
| D.E.R.-330 | 78.4 wt. % |
| Methylon-75108 | 20.0 wt. % |
| FC-520 | 1.0 wt. % |
| FC-430 | 0.6 wt. % |

-continued

| | |
|---|---|
| Formula XXI | |
| ERL-4221 | 60.4 wt. % |
| D.E.R.-330 | 38.0 wt. % |
| FC-520 | 1.0 wt. % |
| FC-430 | 0.6 wt. % |
| Formula XXII | |
| ERL-4221 | 78.4 wt. % |
| Methylon-75108 | 20.0 wt. % |
| FC-520 | 1.0 wt. % |
| FC-430 | 0.6 wt. % |
| Formula XXIII | |
| D.E.R.-330 | 91.5 wt. % |
| EMI-24 | 8.0 wt. % |
| FC-430 | 0.5 wt. % |
| Formula XXIV | |
| D.E.R.-330 | 81.5 wt. % |
| EPN-1139 | 10.0 wt. % |
| EMI-24 | 8.0 wt. % |
| FC-430 | 0.5 wt. % |
| Formula XXV | |
| D.E.R.-330 | 81.5 wt. % |
| Niax LHT-240 | 10.0 wt. % |
| EMI-24 | 8.0 wt. % |
| FC-430 | 0.5 wt. % |
| Formula XXVI | |
| XU 252 | 53.5 wt. % |
| D.E.R.-330 | 13.4 wt. % |
| FC-430 | 0.3 wt. % |
| HY2964 | 32.8 wt. % |
| Formula XXVII | |
| XU 252 | 78.4 wt. % |
| D.E.R.-330 | 19.6 wt. % |
| FC-520 | 1.4 wt. % |
| FC-430 | 0.6 wt. % |
| Formula XXVIII | |
| XU 252 | 89.3 wt. % |
| FC-520 | 1.3 wt. % |
| FC-430 | 0.5 wt. % |
| Actipol E-6 | 8.9 wt. % |
| Formula XXIX | |
| XU 252 | 83.0 wt. % |
| EMI-24 | 8.3 wt. % |
| FC-430 | 0.4 wt. % |
| Actipol E-6 | 8.3 wt. % |
| Formula XXX | |
| XU 252 | 66.4 wt. % |
| D.E.R.-330 | 16.6 wt. % |
| FC-430 | 0.4 wt. % |
| HY943 | 16.6 wt. % |
| Formula XXXI | |
| XU 252 | 82.8 wt. % |
| HY 943 | 16.7 wt. % |
| Silwet L-7604 | 0.5 wt. % |
| or | |
| FC-430 | |
| Formula XXXII | |
| XU 252 | 66.7 wt. % |
| HY 2964 | 32.9 wt. % |
| Silwet L-7604 | 0.4 wt. % |
| or | |
| FC-430 | |
| Formula XXXIII | |
| XU 252 | 76.6 wt. % |
| HY 943 | 15.3 wt. % |
| Silwet L-7604 | 0.4 wt. % |
| Actipol E-6 | 7.7 wt. % |

-continued

| | |
|---|---|
| Formula XXXIV | |
| XU 252 | 62.7 wt. % |
| HY 2964 | 30.7 wt. % |
| FC-430 | 0.3 wt. % |
| Actipol E-6 | 6.3 wt. % |
| Formula XXXV | |
| XU 252 | 90.5 wt. % |
| EMI-24 | 9.0 wt. % |
| FC-430 | 0.5 wt. % |
| Formula XXXVI | |
| D.E.R.-330 | 81.5 wt. % |
| XU 252 | 10.0 wt. % |
| EMI-24 | 8.0 wt. % |
| FC-430 | 0.5 wt. % |

The room temperature gelation plastic composition includes at least one resinous component, which may be a vinyl ester derived from epoxy novolac compounds such as those hereinabove described, or alternatively, a polyester resin. Preferably, the polyester resin is a rigid, low viscosity unsaturated polyester resin. Styrene monomer may be included with the epoxide resin or the polyester resin.

Examples of low viscosity rigid, unsaturated polyester resin compositions are those sold by Reichhold Chemicals, Inc., Jacksonville, Fla., as Polylite R 32-138 and Polylite R 32-830. Polylite 32-138 has a flash point (Seta closed cup) of 89° F., a specific gravity of from 1.03 to 1.13, and a Brookfield viscosity of from 100 to 200 cp. Polylite-138 also includes from 34% to 38% of styrene monomer, and has a gel time (in 1.25% Superox MEK peroxide 46-709) of from 10 to 15 minutes.

An example of a vinyl ester derived from an epoxynovolac compound which may be employed is Derakane 470-36, which, as hereinabove described, also includes from 30% to 50% by weight of a styrene monomer, and has a Brookfield viscosity at 25° C. of from 160 to 250, and a specific gravity of 1.071.

The room temperature gelation system plastic composition may further include at least one catalyst component, preferably a peroxide catalyst component, at least one promoter component, at least one accelerator component, and at least one surfactant.

Catalysts which may be employed, when an epoxy novolac-based vinyl ester is the resinous component, include, but are not limited to, peroxide catalysts such as cumene hydroperoxide catalysts and benzoyl peroxide catalysts. The catalyst may be in the form of a solution or a powder. When a polyester resin is employed, the preferred catalyst is a methyl ethyl ketone (MEK) peroxide catalyst, which may be in the form of a solution or powder.

Promoter components which may be employed include, but are not limited to, naphthanates, such as cobalt napthanate. The promoter may be in the form of a solution.

Accelerators which may be employed include, but are not limited to, anilines such as dimethylanline.

Surfactants which may be employed include, but are not limited to, organomodified polymethylsiloxane copolymer surfactants such as those hereinabove described.

The resinous component, whether an epoxide resin or a polyester resin, may be present as the only component in the room temperature gelation system, or is present in the system in an amount of from about 97 wt % to about 98.5 wt %. The catalyst component may be present in an amount from about 1.0 wt % to about 2.0 wt %. The promoter component may be present in an amount up to about 0.2 wt %. The accelerator may be present in an amount from about 0.2 wt % to about 0.5 wt %. The surfactant may be present in an amount of up to about 0.4 wt %.

Representative examples of room temperature gelation plastic compositions which may be employed in the present invention are given in Formulae XXVII through XLIII listed below.

| | |
|---|---|
| Formula XXXVII | |
| Derakane 470-36 | 97.2 wt. % |
| Cumene hydroperoxide (80%) | 2.0 wt. % |
| Cobalt naphthanate (6%) | 0.2 wt. % |
| Dimethylaniline | 0.2 wt. % |
| Silwet L-7604 | 0.4 wt. % |
| Formula XXXVIII | |
| Derakane 470-36 | 97.9 wt. % |
| Cumene hydroperoxide (80%) | 1.0 wt. % |
| Cobalt naphthanate (6.6%) | 0.2 wt. % |
| Dimethylaniline | 0.5 wt. % |
| Silwet L-7604 | 0.4 wt. % |
| Formula XXXIX | |
| Derakane 470-36 | 98.4 wt. % |
| Cumene hydroperoxide (80%) | 1.0 wt. % |
| Cobalt naphthanate (6%) | 0.2 wt. % |
| Silwet L-7604 | 0.4 wt. % |
| Formula XL | |
| Derakane 470-36 | 97.4 wt. % |
| Benzoyl peroxide (80% Powder) | 2.0 wt. % |
| Dimethylaniline | 0.2 wt. % |
| Silwet L-7604 | 0.4 wt. % |
| Formula XLI | |
| Derakane 470-36 | 98.1 wt. % |
| Benzoyl Peroxide (98% Powder) | 1.0 wt. % |
| Dimethylaniline | 0.5 wt. % |
| Silwet L-7604 | 0.4 wt. % |
| Formula XLII | |
| Polylite 32-138 | 98.35 wt. % |
| MEK Peroxide (9%) | 1.25 wt. % |
| Silwet L-7604 | 0.40 wt. % |
| Formula XLIII | |
| Polylite 32-138 | 78.68 wt. % |
| Polylite 31-830 | 19.67 wt. % |
| MEK Peroxide (9%) | 1.25 wt. % |
| Silwet L-7604 | 0.40 wt. % |

In accordance with another embodiment of the invention, the plastic composition which is applied to the substrate may be a mixture of an expanding polycyclic monomer such as a spiroorthocarbonate or spiroorthoester, formed with a combination of a diepoxy oligomer such as a diglycidylether, and a lactone in a concentration of from about 1:2.5 to about 1:4.5 by weight of the oligomer. To this mixture there may be added a catalytic quantity of a boron trihalide-amine complex and a catalytic quantity of an aromatic photocatalyst which releases a carbonium ion upon ultraviolet irradiation. After the printing medium is applied to the substrate, the printing medium may be cured by ultraviolet light and/or by heating. Alternatively, a di- or tri-functional acrylate may be added to the initial mixture. Preferably, the expanding monomer is a spiroorthoester formed in situ by the reaction of a lactone such as γ-butyrolactone or γ-caprolactone with an epoxide. The expanding monomer may also be a polycyclic ring system, wherein the rings are opened during polymerization. The diepoxy oligomer may be bisphenol-A diglycidyl ether. The aromatic photocatalyst may be a triphenyl sulfonuim hexafluoro antimonate (eg., FX-512 as hereinabove described), or arsenate, or phosphate, or Irgacure 261. The Lewis acid tertiary amine complex catalyst may be selected from boron trichloride N,N'-dimethyl piperazine salt, boron trifluoride monoethylamine salt, orthophenylene diamine-boron trifluoride salt, or a 4,4'diamine diphenylsulfone-boron trichloride salt.

The plastic composition may also include a fluorocarbon sulfonic acid salt, which is employed as a flow aid. Examples of such plastic compositions containing the hereinabove described expanding polycyclic monomers and catalysts are further described in U.S. Pat. No. 4,738,899. A commercially available example of such a plastic composition is sold as EP2003, by Epolin, Inc., of Newark, N.J. This product has a viscosity at room temperature of from about 2,000 to about 4,000 cP, and a specific gravity of 1.1.

The plastic composition may be applied to the printing substrate by various means well known in the art. The method of the present invention is particularly applicable to the application of the plastic composition as a liquid to a printing roll or cylinder which is employed in a rotogravure printing process. The printing roll or cylinder may be made of aluminum, steel, or plastic.

Prior to the application of the plastic composition to the printing roll or cylinder, the printing roll or cylinder may be pretreated by means of a plasma or corona pretreatment to clean and/or alter the surface (i.e., lower the surface tension) of the cylinder or roll for improved film or coating wetout and bonding strengths.

When a corona pretreatment of the surface of the printing roll or cylinder is employed, the surface of the printing roll or cylinder is treated with an accurately-directed electrical bombardment of the surface of the printing roll or cylinder to clean and/or alter the surface of the printing roll or cylinder. An example of such a corona pretreatment is the Tantec HV05 System, as sold by Tampo Print America Inc., of Schaumburg, Ill.

When an aluminum printing cylinder is employed, the surface may be pretreated so as to provide an anodized surface. When a steel cylinder is employed, the cylinder may be treated with an oxide such as black oxide, or may be treated so as to provide an iridited surface.

Methods of applying the plastic composition include spraying the composition onto the surface of the printing substrate such as the printing roll or cylinder. Such spraying may be accomplished through the use of a nozzle through techniques known in the art. Other methods which may be employed include dip coating, spin coating, and ring coating. The coating, upon application to the surface of the printing substrate, preferably has a thickness of from about 3 mils to about 15 mils, preferably from about 3.2 mils to about 3.5 mils, and most preferably about 3.5 mils.

In one embodiment, any of Formulae I through XVI, or a plastic composition which includes a mixture of an expanding polycyclic monomer such as a spiroorthocarbonate or spiroorthoester, formed with a combination of diepoxy oligomer such as a diglycidyl ether, and a lactone in a concentration of about 1:2.5 to about 1:4.5 by weight of the oligomer, (eg., Epolin EP 222003, as hereinabove described), may be applied to the printing roll or cylinder. The plastic composition is applied by a cylinder-like application means having a flattened end. The flattened end has an opening which serves as the orifice. The flattened end is formed by the intersection of the cylinder with a plane at an angle other than a right angle to the cylinder. The orifice has an opening of having a bore diameter of from about 0.010" to about 0.055", preferably at about 0.030". The opening also has as major axis of from about 0.040" to about 0.440".

The plastic composition, when applied to the printing roll or cylinder, has a viscosity of from about 800 cP to about 5,000 cP, preferably from about 1,000 cP to about 2,000 cP. The plastic composition is applied at a pressure of from about 8 psi to about 60 psi, preferably at about 30 psi.

The orifice size, viscosity of the plastic composition, and pressure at which the plastic composition is applied are calculated such that when the plastic composition is applied to the printing roll or cylinder, the thickness of the plastic composition deposited upon the cylinder will be from about 3 mils to about 15 mils, preferably from about 3.2 mils to about 3.5 mils, and most preferably at about 3.5 mils. The plastic composition is applied to the printing roll or cylinder at room temperature (about 23° C.), while the printing roll or cylinder, prior to application of the plastic composition, may be preheated to a temperature of from about 23° C. to about 40° C., preferably to about 30° C.

The application means is part of a constant delivery system which includes a piston like component that forces the plastic composition from the orifice and onto the printing roll or cylinder. The constant delivery system is adapted to lay up, or deposit, the plastic composition at a desired thickness in a single pass of the application means across the length of the printing roll or cylinder.

In one embodiment, the printing roll or cylinder has a diameter of 361 mm, and rotates at a speed of from about 30 rpm to about 90 rpm, preferably at about 45 rpm, as the plastic composition is being applied. Through such application of the plastic composition to the printing roll or cylinder, there is formed a series of generally circular cross-sectional strips of the coating upon the printing roll or cylinder. These strips of plastic composition, upon application to the printing roll or cylinder, self level and merge to become a continuous coating of substantially uniform thickness on the printing roll or cylinder having an average thickness of from about 3 mils to about 15 mils, preferably from about 3.2 mils to about 3.5 mils, most preferably about 3.5 mils.

Upon application of the raw plastic composition to the substrate, it is cured so as to form a plastic coating covering the substrate, said coating now capable of being etched to provide a printing surface. Methods of curing include, but are not limited to, ultraviolet irradiation (which may be followed by heating), heating, and gelation at room temperature. The method employed to cure the composition depends upon the particular plastic composition applied to the printing substrate.

After the plastic coating is applied to the substrate and cured, it is engraved so as to provide a printing medium or image carrier. The engraving may be accomplished by any of various engraving methods known in the art; however, a preferred method of engraving is electronic engraving. Electronic engraving may, in one embodiment, be carried out using a diamond stylus which has an included angle of from about 110° to about 130°. The narrower the included angle, the deeper the stylus cuts into the plastic coating. As the stylus cuts into the coating, it forms a plurality of wells in the coating. Each well has an angled wall, and is smaller at the bottom than at the top.

In one embodiment, the reliability of electronic engraving can be enhanced by employing an air knife device to aid in the removal of chips away from the support, or foot, of the diamond stylus. The air knife dispenses a precise, focused, and continuous or pulsed air stream. The air stream moves in a direction opposite that of the movement of the cylinder. The air stream directs chips away from the support, or foot, of the diamond stylus, the cutting diamond, and the burr cutter in a direction toward a vacuum device, whereby the chips may be removed from the printing surface by the vacuum device located in the cutting head.

In one embodiment, prior to engraving, the plastic coating may be contacted (preferably by spraying) with a finely divided fluoropolymer as a dry film lubricant for the plastic coating. The dry film lubricant provides for lubrication of the support, or foot, of the diamond stylus as the stylus traverses the plastic coating during the engraving. Such lubrication provides for improved penetration of the surface of the plastic coating by the diamond stylus and provides for increased life of the diamond stylus. A preferred finely divided fluorpolymer powder is a micronized tetrafluoroethylene powder. An example of such a micronized tetrafluoroethylene powder is sold by DuPont, Wilmington, Del., as Vydax.

In another alternative, the plastic coating is a laser engravable or laser-responsive coating, wherein the plastic coating, such as those hereinabove described, further includes at least one pigment, and preferably is opaque, whereby the plastic coating becomes laser-responsive, i.e., the coating is capable of absorbing a laser beam emitted from an appropriate source. Through the absorption of the laser beam by the pigmented coating, a desired image is engraved within the coating.

Suitable pigments which may be added to the plastic coating in order to render the coating laser engravable include, but are not limited to, black silicic pigments (containing carbon-encapsulated silica particles), and carbon black. The at least one pigment is present in the coating in an amount effective to render the coating laser-responsive or laser engravable. Such pigments may be employed alone or in combination. The pigment may be present in the laser engravable composition in an amount of from about 1 wt. % to about 25 wt. %, preferably from about 3 wt. % to about 20 wt. %.

In one embodiment, the at least one pigment is a black silicic pigment. An example of a black silicic pigment which may be employed is Ebony Novacite®, a product of Malvern Minerals Company, Hot Springs National Park, Ark. Such product has the following physical and chemical properties:

| | |
|---|---|
| Apparent Bulk Density | 35 lbs./cu. ft. |
| True Density | 21.5 lbs/cu. ft. |
| Moisture Loss (2 hrs. at 110° C.) | 0.21% |
| Loss on Ignition (30 min. at 1,750° C.) | 8.31% |
| Specific Gravity | 2.60 |
| Fisher Porosity | .69 |
| Fisher Average Particle Size | 1.69 microns |
| % Finer than 44 Microns | 100.0 |
| % Finer than 20 Microns | 98.2 |
| Oil Adsorption (Spatula Rub Out) | 30.9% |
| Hegman Grind (Typical) | 6 |
| Typical Chemical Composition | |
| Silica ($SiO_2$) | 58.00% |
| Carbon | 3.09% |
| Sulfur | 0.08% |
| Aluminum Oxide ($Al_2O_3$) | 21.06% |
| Ferric Oxide ($Fe_2O_3$) | 2.29% |
| Titanium Oxide ($TiO_2$) | 1.40% |

-continued

| | |
|---|---|
| Calcium Oxide (CaO) | 6.88% |

In another embodiment, the pigment is carbon black. An example of a carbon black pigment which may be employed is Special Black 250, a product of Degussa Corporation, Pigments Division, Teterboro, N.J. Such product, in general, has the following properties:

| | |
|---|---|
| pH | 3 |
| Ash | 0.4% |
| Compacted density | 500 g/l |
| Particle size | 56 nm |
| Surface area | 40 $m^2/g$ |

Representative examples of laser engravable plastic compositions which may be employed are given in Formulae XLIV through XLVII hereinbelow:

| | |
|---|---|
| Formula XLIV | |
| EP 2003 | 92 wt. % |
| Ebony Novacite | 8 wt. %. |
| Formula XLV | |
| EP2003 | 95 wt. % |
| Special Black 250 | 5 wt. %. |
| Formula XLVI | |
| EP2003 | 92 wt. % |
| Ebony Novacite | 6 wt. % |
| Special Black 250 | 2 wt. % |
| Formula XLVII | |
| EP2003 | 93 wt. % |
| Ebony Novacite | 1 wt. % |
| Special Black 250 | 6 wt. %. |

In one embodiment, the laser engravable coating is deposited as a single layer upon the printing roll or cylinder to form a continuous coating having a substantially uniform thickness on the printing roll or cylinder of from about 3 mils to about 15 mils, preferably from about 3.2 mils to about 3.5 mils, most preferably at about 3.5 mils, as hereinabove described.

After the laser engravable composition is applied to the substrate, the composition may be cured as hereinabove described. After curing, the laser engravable medium then is contacted with a laser beam, whereby the laser beam forms a plurality of wells in the coating which have a desired depth. The laser which may be employed may be selected from any of a plurality of lasers known to those skilled in the art, including, but not limited to, YAG (yttrium-argon-garnet) lasers, YIG (yttrium-iron-garnet) lasers, and $CO_2$ lasers. It is to be understood, however, that the scope of the present invention is not intended to be limited to any specific type of laser to be employed.

In another embodiment, a coating which includes a first, or lower layer and a second, or upper layer may be applied to the printing roll or cylinder. The lower layer may be formed by applying a non-pigmented, non-laser engravable, preferably clear or transparent, plastic coating. The transparent plastic coating may be any plastic coating, including, but not limited to, those hereinabove described. The lower layer may have a thickness as hereinabove described. Once the non-pigmented, non-laser-engravable, lower layer coating is applied, the upper layer, which is a pigmented, laser engravable (i.e., laser-responsive) coating as hereinabove described then is applied atop the non-laser engravable coating which serves as the lower layer. In such an embodiment, the laser engravable coating is contacted with a laser beam such that the laser penetrates the entire thickness of the laser engravable coating, thereby forming a plurality of concave "wells" in the plastic coating wherein the wells have a depth equal to the thickness of the laser engravable coating. The laser beam forms the "wells" only in the laser engravable coating which is the upper layer of the plastic coating. The laser beam is not absorbed by lower layer, and therefore the laser beam does not form wells in the lower layer of the coating. The resulting coating of the substrate thus is comprised of (i) a lower non-engraved plastic, preferably transparent layer which may be formed of any plastic material, including but not limited to, the materials hereinabove described, and having a thickness of from about 3 mils to about 15 mils, preferably from about 3.2 mils to about 3.5 mils, most preferably about 3.5 mils, also as hereinabove described; and (ii) a pigmented, laser engraved upper layer having a plurality of engraved wells which have a depth which is equivalent to the thickness of the pigmented laser, engraved layer. Thus, the depth of the engraved wells of the plastic coating may be controlled by controlling the thickness of the laser-engravable upper layer. In general, the thickness of the laser engravable upper layer is in the order of from about 40 microns to about 55 microns.

In another embodiment, when the rotogravure engravable plastic coating includes a mixture of an expanding polycyclic monomer being selected from the group consisting of a spiroorthocarbonate and a spiroorthoester, as herein above described, and which also may further include a boron trihalide amine complex as hereinabove described, the rotogravure engravable plastic coating further includes at least one adhesion promoter. Examples of at least one adhesion promoter which may be employed include, but are not limited to, silanes. An example of a silane which may be employed is glycidoxypropyltrimethoxy silane. Although the scope of this embodiment is not to be limited to any theoretical reasoning, it is believed that the adhesion promoter, such as a silane, enables the expanding polycyclic monomer to flow evenly upon and then bind to certain printing substrates. For example, this embodiment is applicable particularly to nickel printing substrates such as nickel printing sleeves which may be fitted over rotatable cylinders, and after fitting, are employed in rotogravure printing.

In one embodiment, a concentrated solution of 99% by weight glycidoxypropyltrimethoxy silane in methanol (an example of which is sold by Dow Corning Corporation as Dow Corning Z 6040 silane) is diluted with at least one alcohol to provide a solution of from about 0.2% by weight to about 2.0% by weight, preferably from about 0.5% by weight to about 0.75% by weight of glycidoxypropyltrimethoxy silane in alcohol. This solution then is applied to a nickel rotogravure printing sleeve. The sleeve may have a thickness of from about 5 mils to about 10 mils, preferably from about 5 mils to about 7 mils, and a length of up to 84 inches. The sleeve in general may have a diameter of from about 3 inches to about 10 inches. Examples of such sleeves are sold by Stork Screens America, Inc., Charlotte, N.C., under the name Stork RCS®. The solution, once applied, is allowed to dry. After drying, the rotogravure engravable plastic coating, which includes an expanding polycyclic monomer as hereinabove described, is applied to the printing sleeve to form a coating layer having a thickness from about 3 mils to about 15 mils, preferably from about 3.2 mils to about 3.5 mils, more preferably about 3.5 mils, as hereinabove described. The sleeve may then be fitted upon a cylinder, and then inked for rotogravure printing.

Once the printing medium or image carrier is formed on the substrate, it is ready for the application of printing ink. Examples of gravure type inks which may be applied to the printing medium include aliphatic hydrocarbon inks such as A-Type inks and B-Type inks; nitrocellouse inks (C-Type); polyamide inks (D-Type); alcohol-based inks (E-Type); polystyrene-based inks (M-Type); chlorinated rubber-based inks (T-Type); vinyl chloride or vinyl acetate copolymer-based inks (V-Type); inks employing water as a solvent base (W-Type); X-Type inks including heat transfer and sublimation inks; foam inks; and ultraviolet curable inks. The ultraviolet curable inks include a pigment admixed with one or more of the epoxide resins and/or photoinitiators hereinabove described with respect to the ultraviolet curable coating system. Preferred inks are those of the A, B, C, D and T Types. The type of ink employed depends upon the type of surface that is to be printed. Upon application of the ink, any excess ink is removed by a doctor blade. It has been found that a doctor blade formed from a polymer such as polyester, nylon, polyethylene, polypropylene, or polyacetal, and having a tapered edge which contacts the printing medium, conditions the image-bearing surface without substantial wear and is a great improvement over metal doctor blades employed in the art with copper-etched surfaces. Most preferably, a polyester doctor blade is employed for removing the excess ink. Examples of polyester doctor blades having a tapered edge which may be employed in accordance with the present invention are those of Esterlam's E350/E500 range of laminated polyester doctor blades, sold by Esterlam International Limited, of Devon, England.

Thus, in accordance with another aspect of the present invention, there is provided a process for preparing a non-metal printing medium for the transfer of an inked image which comprises applying ink to the printing medium, and removing excess ink from the printing medium by contacting the printing medium with a doctor blade, having a tapered edge, said doctor blade being formed from a polymer selected from the group consisting of polyester, nylon, polyethylene, polypropylene and polyacetal to prepare thereby the printing medium for the transfer of an inked image. Preferably, the doctor blade is formed from a polyester.

Upon application of the ink, the printing medium and printing substrate are then ready to print any of a wide variety of materials which may be printed by the rotogravure process.

The invention will now be described with respect to the drawings, wherein:

FIG. 4 is a cross-sectional view of a rotogravure printing cylinder or drum coated with a transparent lower layer and a laser-engraved pigmented upper layer;

FIG. 5 is a lengthwise cross-sectional view of a rotatable cylinder upon which may be fitted a rotogravure printing sleeve; and FIG. 6 is a cross-sectional view of a rotogravure printing sleeve fitted upon a rotatable cylinder.

Figure 1:
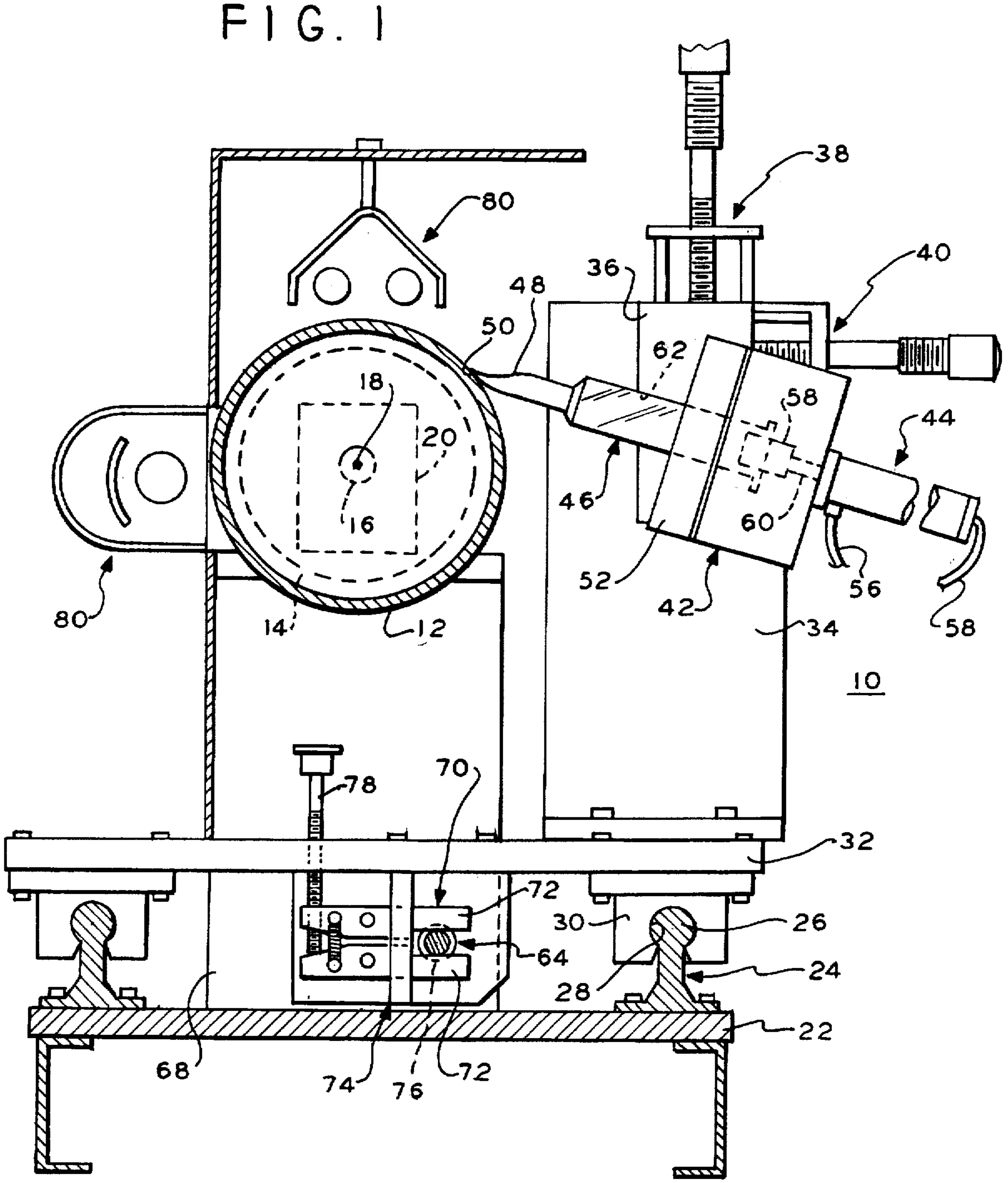
FIG. 1 is a partially sectioned, side elevation of an embodiment of an apparatus for applying the compositions of the present invention.

Referring now to the drawings, there is shown an apparatus 10 for applying a plastic coating as hereinabove described to a printing cylinder or roll 12 or other substrate. The cylinder 12 may be steel, aluminum or plastic and may be pretreated as hereinabove described. In one embodiment, the cylinder 12 has a diameter of 361 mm.

The cylinder 12 is mounted on a holder, such as a mandrel, collet or chuck 14. The holder 14 and the cylinder 12 are selectively rotated by a drive shaft 16 about the main axis 18 of the cylinder 12. The holder 14 may be rotatably supported at either end by standards 20, only one of which is shown. The standards 20 are fixed to a base or platform 22 which supports the apparatus 10.

The base 22 also supports opposed guide rails 24 having lobar support portions 26 keyed into mating ways 28 formed in supports 30. The supports 30 mount a carriage 32 which is horizontally slidable into and out of the plane of FIG. 1 along a fixed path above the base 22. The carriage 32 in turn mounts an upright support member 34 which extends above the mounted cylinder 12. The member 34 holds for orthogonal movement, perpendicular the main axis 18 of the cylinder 12, a block 36. The block 36 is orthogonally adjustable relative to the axis 18 by an appropriate mechanism, such as the micrometer-type of adjusters 38 and 40 shown.

Fixed to the block 36 is a mount 42. One side of the mount 42 carries a piston-cylinder 44. Removably carried by and protruding from the other side of the mount 42 is a piston-like device 46 which carries a cylinder-like tube or nozzle 48 having an output aperture 50 proximate the cylinder 12. In one embodiment, the cylinder-like tube or nozzle 48 may be a needle, and the piston-like device 46 may be a syringe. The cylinder-like tube or nozzle 48 has a cylindrical configuration having a flattened end which serves as orifice 50. The flattened end is formed by the intersection of nozzle 48 with a plane at an angle other than a right angle to the cylinder-like tube. The orifice has an elliptical opening having a bore diameter of from about 0.010" to about 0.055" in length, preferably of about 0.030", and a major axis of from about 0.040" to about 0.440". Orifice 50 preferably has an area of from about $1.2\times10^{-3}$ to about $7.6\times10^{-2}$ square inches. The piston-like device 46 may be selectively held in and removed from the mount 42 by the attachment and removal of a cover 52 on the mount 42.

The piston (not shown) of the piston-cylinder 44 is leftwardly movable toward the piston-like device 46 by applying pressurized hydraulic fluid to a line 54 communicating with the variable volume (not shown) to the right thereof. The piston is rightwardly movable by application of hydraulic fluid to a line 56 communicating with the variable volume to the left of the piston (not shown). The piston (not shown) of the piston-cylinder 44 is connected to the plunger or piston 58 of the piston-like device 46 or similar device by a rod 60. The variable volume 62 of the piston-like device 46 may be filled with a measured quantity of a plastic composition as hereinabove described. The plastic composition has a viscosity of from about 800cP to about 5,000cP, preferably from about 1,000cP to about 2,000cP. Once the piston-like device 46 is so filled and held in the mount 42 by the cover 52, pressurization of the line 54 forces the plastic through the tube 48 and out of the orifice 50 onto the surface of the cylinder 12. Preferably, orifice 50 touches the surface of cylinder 12. Orifice 50 may be slightly tilted so as to deposit the plastic material upon cylinder 12 in a wavelike form. The plastic material then self-levels immediately. Preferably, a constant amount of plastic per unit time is delivered through the orifice 50 onto the surface of the cylinder 12. Preferably, the plastic is dispensed at a rate of from about 0.035cc to about 0.155cc per revolution of cylinder 12. The plastic is forced through the tube 48 and out of the orifice 50 onto cylinder 12 at a pressure of from about 8 psi to about 60 psi, preferably at about 30 psi.

The carriage 32 and hence the orifice 50 is linearly movable along the main cylinder axis 18 by a lead screw 64 to move linearly the orifice 50 over and across the surface of the rotating drum 12 so as to lay up or deposit the composition in a desired thickness in a single pass of the orifice 50 across cylinder 12. Preferably, the orifice 50 travels along cylinder 12 at a rate of about ½" per minute. As the plastic composition is being applied to the drum 12, the drum 12 is rotated at a rate of from about 30 rpm to about 90 rpm, preferably at about 45 rpm. Preferably, the drum 12 has a surface velocity of from about 5.0 inches per second to about 35.0 inches per second, more preferably from about 7.5 inches per second to about 16.0 inches per second. The lead screw 64, which may be selectively rotated by a drive gear 66 (FIG. 2) is rotatably held in opposed supports 68 (only one is shown) on the base 22. The lead screw 64 coacts with a traveler nut 70 of any conventional design. The traveler nut 70 herein comprises a pair of arms 72 held in a frame 74 for pivoting toward and away from each other. Each arm 72 contains a threaded concavity 76 at one end which engagingly mates with the threads of the lead screw 64. Rotation of a thumb screw 78 threaded through the other end of one arm 72 and bearing against the other end of the other arm 72 forces the concavities 76 against the lead screw 64, so that rotation of the lead screw 64 is translated into linear movement of the frame 74. Linear movement of the frame 74 effects linear movement of the carriage 32, as above described. Release of the traveler nut 70 from the lead screw 64 and linear positioning of the carriage 32 without lead screw 64 rotation may be achieved by turning the thumb screw 78 to disengage the end of the other arm 72.

The apparatus 10 may include facilities 80 for curing the plastic film on the cylinder 12 with heat, UV or other radiation.

Figure 2:
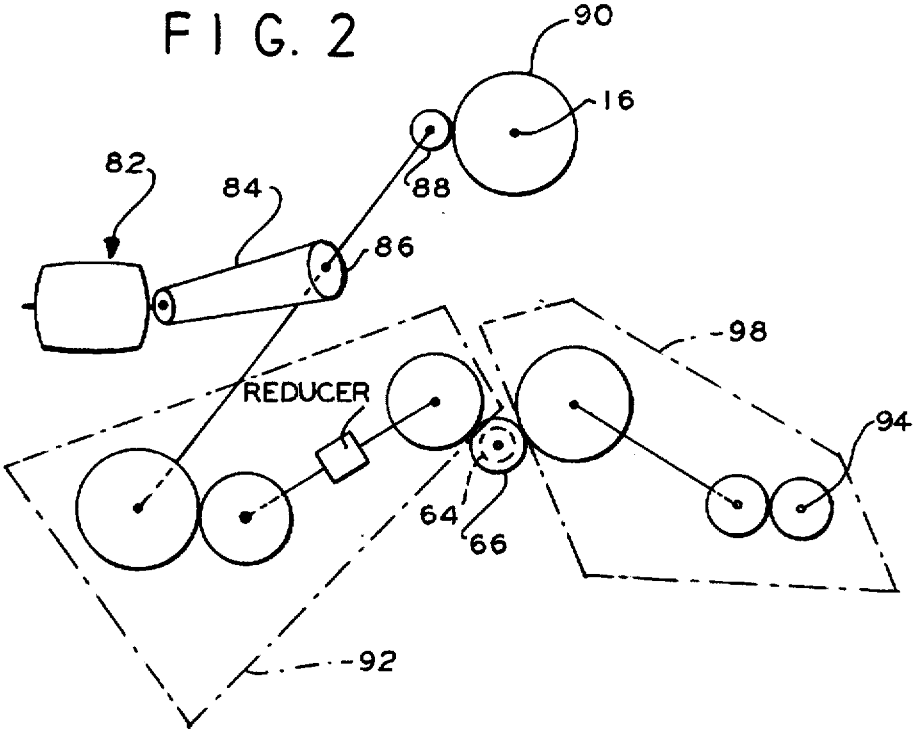
FIG. 2 is a schematic diagram of a motive power train usable to operate the apparatus of FIG. 1.

FIG. 2 schematically depicts one mode of simultaneously rotating the cylinder 12 and linearly moving the output aperture 50 while forcing plastic therefrom onto the rotating cylinder 12 by the action of the piston-cylinder 44. Clearly, numerous other arrangement may be used. A variable speed motor 82 drives a belt 84 to rotate a pulley 86. Rotation of the pulley 86 rotates a drive gear 88 to rotate a driven gear 90 and the drive shaft 16. The drive gear 66 for the lead screw 64 is similarly rotated by the motor 82 through a gear train/reducer combination 92. The drive gear 66 in turn operates a drive shaft 94 of a pump 96 (FIG. 3) for the piston-cylinder 44 through a gear train 98.

Figure 3:
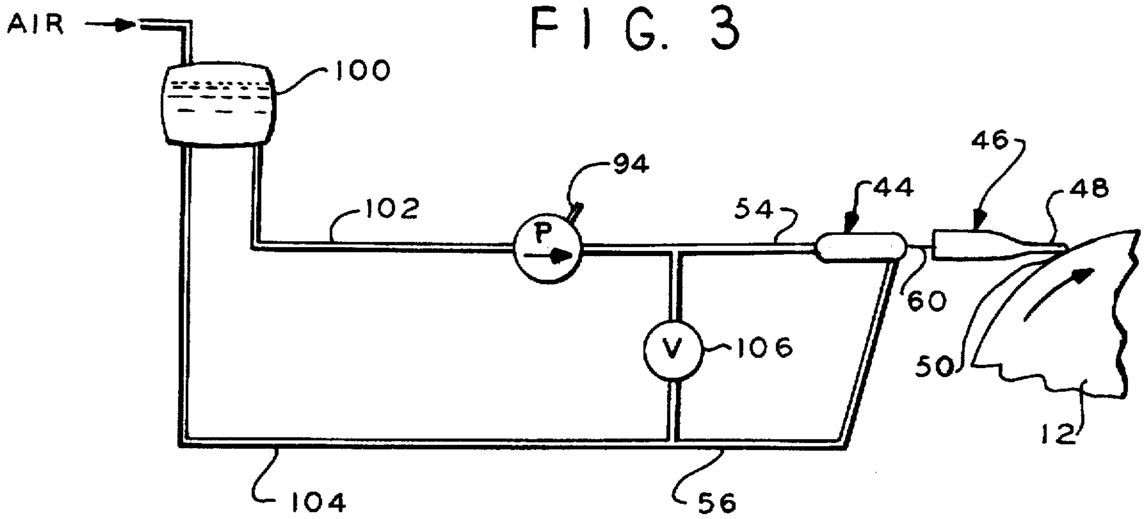
FIG. 3 is a schematic diagram of a hydraulic system for depositing a plastic film with the apparatus and power train of FIGS. 1 and 2.

In FIG. 3, the pump 96 pumps hydraulic fluid from a reservoir 100 via a line 102 and returns the fluid to the reservoir 100 via a line 104. A shunt valve 106 determines whether or not operation of the pump 96 effects a flow of the plastic composition from the output aperture 50. When the valve 106 is open, the pump moves the fluid from the reservoir 100 through the line 102 and the valve 106 back to the reservoir 100 through the line 104. When the valve 106 is closed, the fluid is forced by the pump 96 through the line 54, which is continuous with the line 106, into the variable volume to the right (in FIG. 1) of the piston of the piston-cylinder 44. As described above, this effects a flow of the plastic composition from the piston-like device 46 onto the surface of the rotating cylinder 12 as the output aperture 50 is linearly moved or scanned across such surface parallel to the main axis 18. The plunger on piston 58 of the piston-like device 46 may be returned to the position of FIG. 1 after a cylinder 12 has been coated by stopping operation of the pump 96, opening the valve manually returning the piston 58 to the position shown in FIG. 1.

When one of the plastic compositions as hereinabove described is applied to cylinder 12, the above apparatus 10 is capable of effecting the deposit of a uniform, continuous and engravable film onto the cylinder 12. The film has a thickness of from about 3 mils to about 15 mils, preferably from about 3.2 mils to about 3.5 mils, and most preferably about 3.5 mils. This is achieved by adjusting the speed of the motor 82; selecting the character of the drive train 84, 86, 88, 90, 92 and 98 and the pitch of the lead screw 64 and the traveler nut 70; adjusting the rotational velocity of the lead screw 64 and of the cylinder 12, the linear velocity of the carriage 32, the spacing between the output orifice 50 and the surface of the rotating cylinder 12, the diameter of the orifice 50, and the rate of movement of the plunger 58 in the piston-like device 46—all in view of the characteristics of the plastic composition chosen—to deposit a helical bead of the plastic composition on the surface of the cylinder 12. Adjacent portions of the bead when issuing from the orifice 50 are slightly larger in diameter than the center-to-center distance between adjacent portions of the helical "track" defined by the tube 48 and the orifice 50 as the cylinder 12 rotates thereunder. This slight overlap of adjacent bead portions and the self-leveling properties of the plastic composition contribute to the ultimate film having a relatively uniform thickness.

It should be clear that numerous variations can be made to the above-disclosed embodiment without departing from the scope or intent of the present invention. The piston-like device 46 and the piston-cylinder 44 may be replaced by a constant volume or metering pump to meter a given volume of plastic per unit time through the orifice 50. The motor-drive train of FIG. 2 may be replaced with individual motive power sources—stepping motor for instance—associated with the collet 14, the lead screw 64 and the pump 96 (or the metering pump for the plastic, if such is used). Moreover, facilities, such as an automated electronic microscope slide adjuster, can replace the micrometer-like adjusters 38 and 40.

The curing means 80 may reside in the apparatus 10 as shown, or the plastic-coated cylinder 12 may be removed from the collet 14 and placed in appropriate curing environment.

Apparatus 10 and methods of applying the plastic compositions to cylinder 12 are further described in copending application Ser. No. 07/692,211, filed Apr. 26, 1991.

After the film has been applied to cylinder 12, the film may be prepared by engraving and other means as hereinabove described so as to provide suitable printing medium.

In one alternative, a film or coating is applied to cylinder 12, wherein the film comprises a clear or transparent, non-laser engravable lower layer 108, and an upper, pigmented laser-engravable layer 110. The lower layer 108 has a thickness of from about 3 mils to about 15 mils, preferably from about 3.2 mils to about 3.5 mils, and most preferably about 3.5 mils. The upper layer 110, which is laser engravable or laser-responsive, has a thickness of from about 40 microns to about 55 microns. Lower layer 108 is applied to cylinder 12 according to the procedures hereinabove described, and then upper layer 110 is applied atop lower layer 108 according to the same method that lower layer 108 is applied to cylinder 12. Once upper layer 110 is applied to lower layer 108, the resulting film or coating is cured, and upper layer 110 is contacted with a laser beam such that the laser beam penetrates upper layer 110 and forms a plurality of concave wells 112 which have a depth equal to the thickness of upper layer 110, thereby forming an engraved film or coating suitable for use in rotogravure printing, whereby the coating has a laser engraved surface layer having a plurality of laser engraved wells having a depth equal to the thickness of upper layer 110.

In another embodiment, as shown in FIGS. 5 and 6, a nickel printing sleeve 128 is fitted over bevel 126 and openings 122 of rotatable cylinder 114. Once the sleeve 128 is fitted over the bevel 126 and openings 122 of cylinder 114, air is injected, at a pressure of from about 80 psi to about 100 psi, into opening 116 of cylinder 114. The air travels through opening 116, into space 118, and then into openings 120. The air is blocked from exiting the openings 120 in cylinder 114 by plugs 124, and instead the air exits the cylinder through openings 122, whereby the air then contracts the sleeve 128, whereby the sleeve 128 is "expanded," i.e., pushed outwardly from the cylinder. The air which exits openings 122 of cylinder 114 thus enables the sleeve 128 to be fitted over the entire length of the cylinder 114 by forming an air cushion between sleeve 128 and cylinder 114. Once sleeve 128 is fitted over cylinder 114, air flow into opening 116 is stopped, whereby the sleeve 128 comes in contact with cylinder 114 and forms a tight fit over the cylinder 114.

Prior to the fitting of the sleeve 128 over the cylinder 114, the sleeve 128 has been coated with a rotogravure engravable plastic coating which includes an expanding polycyclic monomer and adhesion promoter as hereinabove described to provide a rotogravure engravable coating. Alternatively, the sleeve 128 may be coated and/or engraved after the sleeve 128 is fitted over cylinder 114.

Ink may be applied to the sleeve 128 in a manner hereinabove described with respect to a rotogravure printing drum, after which the sleeve 128 may be employed in rotogravure printing by rotating sleeve 128 through rotation of cylinder 114, followed by contact of a desired object to be printed with inked sleeve 128. Once the rotogravure printing task is completed, sleeve 128 may be removed from cylinder 114 by injecting air into opening 116 at a pressure of from 80 psi to 100 psi, whereby the air travels through opening 116, space 118, openings 120, and openings 122, whereby the air pushes sleeve 128 outwardly from cylinder 114, and sleeve 128 may be removed from cylinder 114.

Thus, this embodiment of the present invention enables one to make coated rotogravure printing sleeves with an engraved rotogravure coating which may be interchanged with each other on a rotatable cylinder. In addition, once the sleeves have no further use as a rotogravure printing medium, they may be discarded easily.

Advantages of the present invention include the ability to provide a printing medium or image carrier upon a printing substrate such as a printing cylinder or printing roll which does not require the use and/or disposal of environmentally hazardous chemicals during its preparation. The method of the present invention, whereby a plastic composition, as opposed to a metal, is applied to a printing substrate, thus provides for a more efficient and environmentally safe process for providing a rotogravure printing medium, which also saves the considerable costs associated with the formation and treatment of copper-etched surfaces.

It is to be understood, however, that the scope of the present invention is not to be limited to the specific embodiments described above. The invention may be practiced other than as particularly described and still be within the scope of the accompanying claims.

What is claimed is:

1. A printing medium comprising:

a printing substrate; and a rotogravure engravable plastic coating covering said printing substrate, said coating including a mixture of an expanding polycyclic monomer being selected from the group consisting of a spiroorthocarbonate and a spiroorthoester, said monomer being formed with a combination of diglycidylether and a lactone in a concentration of from about 1:2.5 to about 1:4.5 by weight of the diglycidylether.

2. The printing medium of claim 1 wherein said printing substrate is a printing cylinder.

3. The printing medium of claim 2 wherein said coating has a thickness of from about 3 mils to about 15 mils.

4. The printing medium of claim 3 wherein said coating has a thickness of from about 3.2 mils to about 3.5 mils.

5. The printing medium of claim 4 wherein said coating has a thickness of about 3.5 mils.

6. The printing medium of claim 1 wherein said expanding monomer is a spiroorthoester formed in situ by the reaction of a lactone, selected from the group consisting of γ-butyrolactone and γ-caprolactone, with an epoxide.

7. The printing medium of claim 1 wherein said coating further includes a boron trihalide-amine complex selected from the group consisting of boron trichloride N, N'-dimethyl piperazine salt, boron trifluoride monoethylamine salt, and a 4,4'-diamine diphenylsulfone-boron trichloride salt; and an aromatic photocatalyst selected from the group consisting of triphenyl sulfonium hexafluoro antimonate, triphenyl sulfonium hexafluoro arsenate, and triphenyl sulfonium hexafluoro phosphate.

8. The printing medium of claim 1 wherein said plastic coating further includes at least one pigment in an amount effective to render said plastic coating laser engravable.

9. The printing medium of claim 8 wherein said at least one pigment is present in said plastic coating in an amount of from about 1 wt. % to about 25 wt. %.

10. The printing medium of claim 9 wherein said at least one pigment is present in said plastic coating in an amount of from about 3 wt % to about 20 wt %.

11. The printing medium of claim 8 wherein said at least one pigment is a black silicic pigment.

12. The printing medium of claim 8 wherein said at least one pigment is carbon black.

13. A printing medium comprising:

a printing substrate; and a plastic coating covering said printing substrate, said coating including (i) a first layer in contact with said substrate, said first layer being formed of a transparent plastic material; and (ii) a second layer covering said first layer, said second layer being laser engravable and including (a) a mixture of an expanding polycyclic monomer being selected from the group consisting of a spiroorthocarbonate and a spiroorthoester, said monomer being formed with a combination of diglycidylether and a lactone in a concentration of from about 1:2.5 to about 1:4.5 by weight of the diglycidylether, and (b) at least one pigment present in an amount effective to render said second layer laser engravable.

14. The printing medium of claim 13 wherein said at least one pigment is present in said second layer in an amount of from about 1 wt. % to about 25 wt. %.

15. The printing medium of claim 14 wherein said at least one pigment is present in said plastic coating in an amount of from about 3 wt. % to about 20 wt. %.

16. The printing medium of claim 13 wherein said at least one pigment is a black silicic pigment.

17. The printing medium of claim 13 wherein said at least one pigment is carbon black.

18. The printing medium of claim 13 wherein said first layer has a thickness of from about 3 mils to about 15 mils.

19. The printing medium of claim 18 wherein said first layer has a thickness of from about 3.2 mils to about 3.5 mils.

20. The printing medium of claim 13 wherein said second layer has a thickness of from about 40 microns to about 55 microns.

21. A printing medium comprising:

a printing substrate; and a rotogravure engravable plastic coating covering said printing substrate, said coating including (i) a mixture of an expanding polycyclic monomer being selected from the group consisting of a spiroorthocarbonate and a spiroorthoester, said monomer being formed with a combination of diglycidylether and a lactone in a concentrate of from about 1:2.5 to about 1:4.5 by weight of the diglycidylether; and (ii) an adhesion promoter.

22. The printing medium of claim 21 wherein said adhesion promoter is glycidoxypropyltrimethoxy silane.

23. A printing medium comprising:

a nickel printing sleeve capable of being fitted over a rotatable cylinder; and a rotogravure engravable plastic coating covering said printing sleeve, said coating including (i) a mixture of an expanding polycyclic monomer being selected from the group consisting of a spiroorthocarbonate and a spiroorthoester, said monomer being formed with a combination of diglycidylether and a lactone in a concentration of from about 1:2.5 to about 1:4.5 by weight of the diglycidylether; and (ii) an adhesion promoter.

24. The printing medium of claim 23 wherein said adhesion promoter is glycidoxypropyltrimethoxy silane.

25. The printing medium of claim 23 wherein said coating has a thickness of from about 3 mils to about 15 mils.

26. The printing medium of claim 23 wherein said coating has a thickness of from about 3.2 mils to about 3.5 mils.

27. The printing medium of claim 26 wherein said coating has a thickness of about 3.5 mils.

28. The printing medium of claim 26 wherein said expanding monomer is a spiroorthoester formed in situ by the reaction of a lactone, selected from the group consisting of γ-butyrolactone and γ-caprolactone, with an epoxide.

29. The printing medium of claim 23 wherein said coating further includes a boron trihalide-amine complex selected from the group consisting of boron trichloride N, N'-dimethyl piperazine salt, boron trifluoride monoethylamine salt, and a 4,4'-diamine diphenylsulfone-boron trichloride salt; and an aromatic photocatalyst selected from the group consisting of triphenyl sulfonium hexafluoro antimonate, triphenyl sulfonium hexafluoro arsenate, and triphenyl sulfonium hexafluoro phosphate.

* * * * *